United States Patent [19]

Williamson et al.

[11] Patent Number: 4,896,119

[45] Date of Patent: Jan. 23, 1990

[54] CW PUMPER CW PUMPED VARIABLE REPETITION RATE REGENERATIVE LASER AMPLIFIER SYSTEM

[75] Inventors: Steven L. Williamson; Girard Mourou; Irl N. Duling, III; Philippe Bado, all of Rochester; Carl H. Petras, Cameron, all of N.Y.

[73] Assignee: The University of Rochester, Rochester, N.Y.

[21] Appl. No.: 618,274

[22] Filed: Jun. 7, 1984

[51] Int. Cl.[4] .............................................. H01S 3/00
[52] U.S. Cl. ....................................... 330/4.3; 372/18
[58] Field of Search ...................... 330/4.3; 372/18, 21, 372/25, 40, 70

[56] References Cited

U.S. PATENT DOCUMENTS

| | | | |
|---|---|---|---|
| 3,388,314 | 6/1968 | Gould | 330/4.3 |
| 3,467,906 | 9/1969 | Cornelly et al. | 330/4.3 |
| 3,571,747 | 3/1971 | Bronfin et al. | 330/4.3 |
| 3,597,695 | 8/1971 | Swain et al. | |
| 3,646,469 | 2/1972 | Buczek et al. | |
| 3,668,536 | 6/1972 | Michon | |
| 3,900,802 | 8/1975 | Milling | 330/4.3 |
| 3,902,130 | 8/1975 | Pike | |
| 3,968,456 | 7/1976 | Welch | |
| 4,156,872 | 5/1979 | Hagen | |
| 4,191,928 | 3/1980 | Emmett | |
| 4,205,278 | 5/1980 | George et al. | |
| 4,243,942 | 1/1981 | Glass | |
| 4,272,733 | 6/1981 | Walling et al. | |
| 4,410,992 | 10/1983 | Javan | |
| 4,425,652 | 1/1984 | Mourou | 372/18 |

OTHER PUBLICATIONS

Sizer et al., "Picosecond Dye Laser . . . Source", 5/1/81, pp. 207-210, Optic Comm., vol. 37, #3.
Sizer et al. "Synchronous Amplification . . . Pulses", 4/83, pp. 506-510, IEEE Journal Quantum Elec., vol. QE-19, #4.
Yuxia et al. "A Pulsed and . . . Oscillator", 9/81, pp. 1723-1726, IEEE Journal Quent Elect., vol. QE-17, #9.
Sizer et al., "Generation and Amplification . . . Source", 10/15/81, pp. 259-262, Opt. Comm., vol. 39, #4.
"Optical Fiber Telecommunications", by Miller et al., Academic Press, 1979, TK5103.59068; See in Particular pp. 499-501 and 544-548.

Primary Examiner—Nelson Moskowitz
Attorney, Agent, or Firm—Martin LuKacher

[57] ABSTRACT

A CW pumped regenerative laser amplifier system capable of producing amplified laser pulses of variable repetition rate (e.g., 10 Hz to 10 kHz) with high energy stability. The regenerative amplifier is seeded by pulses injected into the optical cavity of the amplifier from a CW pumped modelocked laser.

27 Claims, 3 Drawing Sheets

CW PUMPER CW PUMPED VARIABLE REPETITION RATE REGENERATIVE LASER AMPLIFIER SYSTEM

DESCRIPTION

The present invention relates to regenerative laser amplifier systems which amplify input pulses and provide amplified, output laser pulses with variable repetition rates, and particularly to a variable repetition rate, regenerative, laser amplifier system having a laser gain medium which is CW or continuously pumped.

The invention is especially suitable for use in providing high energy pulses in the milliJoule (mJ) range when operating at up to approximately 3 kHz in pulse repetition rate; the output pulses being approximately 100 picoseconds (ps) in duration and having high energy stability. The pulses may be produced at high repetition rates with constant average power for use in applications where linear effects, induced by these laser pulses, are desired; for example in driving dye laser systems. The pulses may be produced at lower repetition rates, for example under 1 kHz with higher energy per pulse, where they are to induced non-linear effects. The system may be used in other applications wherever variable repetition rate laser pulses are needed. Higher output powers from the system will become available as other laser gain medium materials become available, and with other configurations of the gain medium, for example slabs, which facilitate the cooling of the medium.

Regenerative laser amplifiers which have heretofore been proposed are not CW pumped. They are pumped with optical pulses, usually from flash lamps. U.S. Pat. No. 3,597,695 issued Aug. 3, 1971 shows a typical pulse pumped regenerative laser amplifier, which is seeded by input laser pulses. Such amplifiers do not provide output pulses of variable repetition rate. They are limited to the repetition rate of their pumping system, usually up to approximately 10 Hz. One limitation on repetition rate arises out of thermal lensing in the laser gain medium. The pump energy necessary to excite the gain medium causes the focal length in the cavity to change, thereby detuning the cavity. Another drawback of typical regenerative amplifiers is instability which is reflected in changes in energy of the output pulses, as well as their jittering in time. This instability is exacerbated when the output pulse rate increases, since thermal loading is higher. In addition, the drivers for the polarization rotating means (typically Pockels cells) which have been available have not been operable reliably to rotate polarization rapidly, in less time than it takes for a pulse to traverse the optical cavity of the amplifier) and at high repetition rates in the kHz range.

Regenerative laser amplifier systems provided by the invention, because they are CW pumped, allow for variable repetition rate without cavity adjustments. Where the repetition rate is less than the inverse fluorescence life time of the excited state of the gain medium, high energy per pulse output pulses may be obtained. The energy per pulse may be adjusted by adjusting the repetition rate so as to obtain output pulses which allow laser systems using such pulses to operate in a linear regime, as where the B integral of the system utilizing the output pulses is adequate to avoid non-linear effects. High repetition rates also provide pulses with constant average power. Such output pulses are desirable when used with systems which are responsive to average power, for example, systems with averaging devices such as photocell detectors which respond to the number of photons per second. Since regenerative amplifier systems provided by the invention are CW or continuously pumped, the output pulses have very high energy stability, for example within one percent energy variation from pulse to pulse.

Accordingly, it is the principal object of the present invention to provide improved regenerative laser amplifier systems which are CW pumped and which capable of providing output pulses with variable repetition rates.

It is a further object of the present invention to provide improved regenerative laser amplifier systems having the advantages of stability, variable energy per pulse, and constant average energy when desired, as discussed above.

It is a still further object of the present invention to provide improved regenerative laser amplifier systems which are seeded by pulses from a laser oscillator which may be constructed using laser heads (units containing the laser gain medium material, the pump lamp and reflector) which are commercially available.

It is a still further object of the present invention to provide improved regenerative laser amplifier systems which may be used to provide a source of laser pulses in a synchronously pumped dye laser system, for example of the type described in U.S. Pat. No. 4,425,652 issued Jan. 10, 1984 to G. Mourou.

Briefly described, regenerative laser apparatus embodying the invention utilizes an optical cavity having a gain medium in the cavity. Means are provided for CW or continuously pumping the gain medium. Means are provided for injecting laser pulses into the cavity. Such injecting means preferably include a CW modelocked laser oscillator having the same lasing wavelength as that of the gain medium which is in the amplifier cavity. In a preferred embodiment of the invention, the gain medium is Nd: YAG for both the amplifier and oscillator. Means are provided for injecting the seed laser pulses into the cavity so as to provide multiple traversals of the cavity and the gain medium therein thereby amplifying the pulses and producing output laser pulses. Means are provided for controlling the rate at which the pulses are injected into the cavity and at which the amplified output pulses are outputted from the cavity. The output pulses are therefore available at variable repetition rates.

The foregoing and other objects, features and advantages of the invention, as well as presently preferred embodiments thereof, will become more apparent from a reading of the following description in connection with the accompanying drawings in which.

Figure 1:
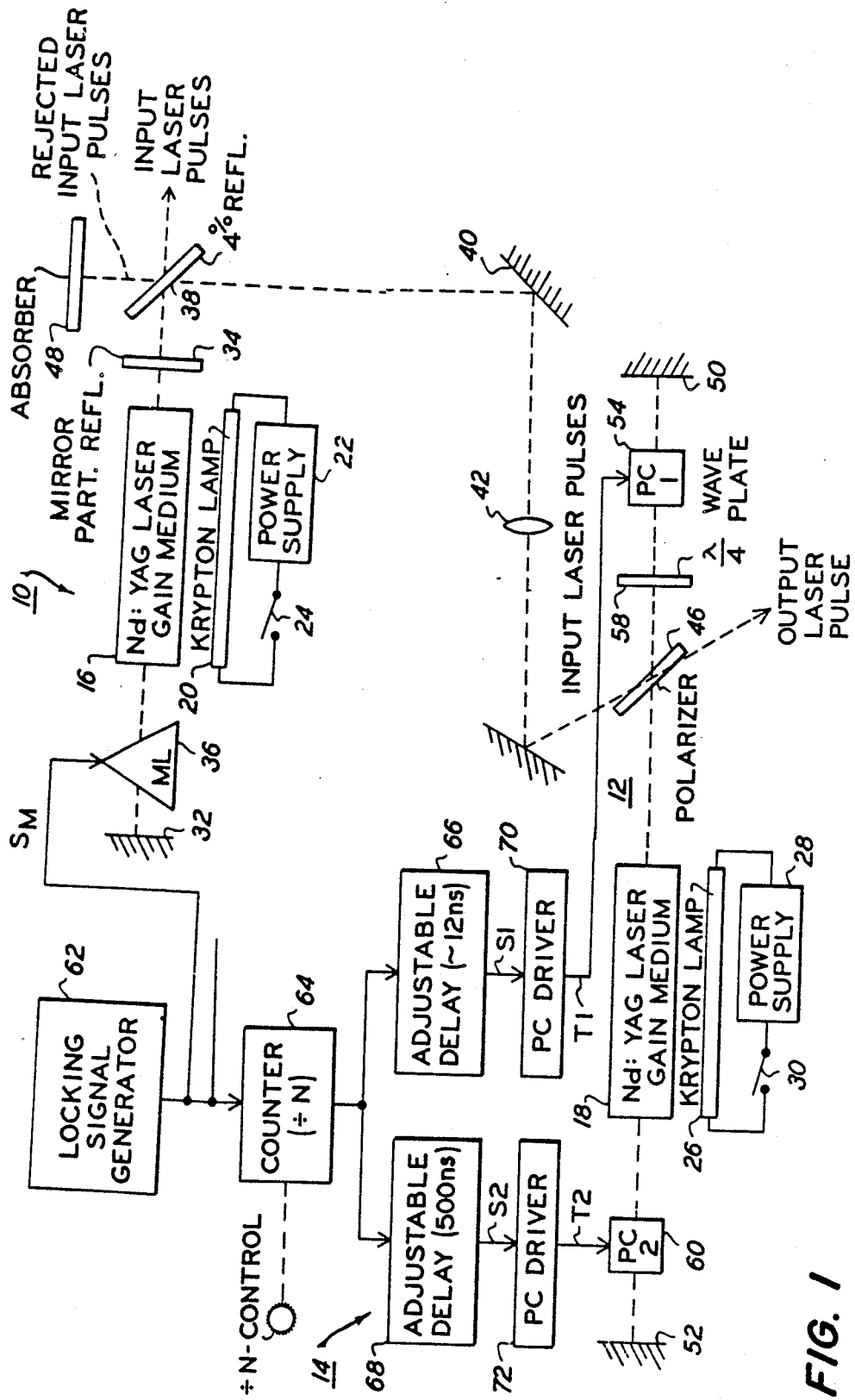
FIG. 1 is a schematic diagram illustrating a CW pumped, variable repetition rate, regenerative laser amplifier system in accordance with a preferred embodiment of the invention.
Figure 2:
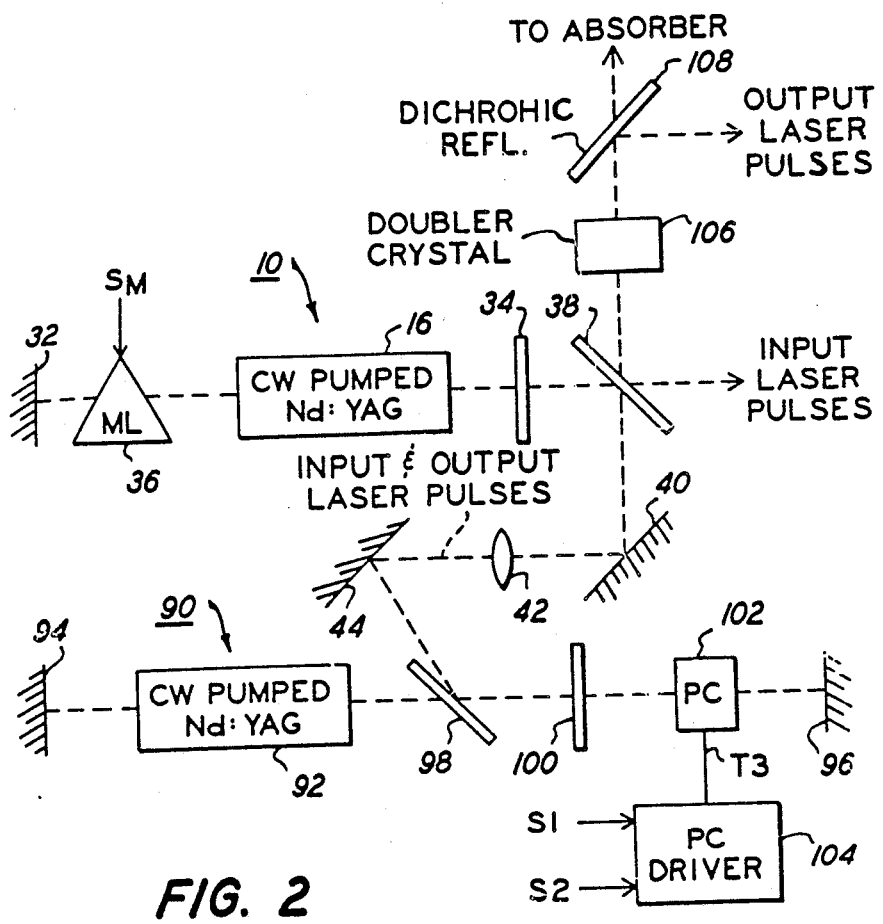
FIG. 2 is a simplified schematic diagram illustrating a CW pumped, variable repetition rate, regenerative, laser amplifier system in accordance with another embodiment of the invention.
Figure 4:
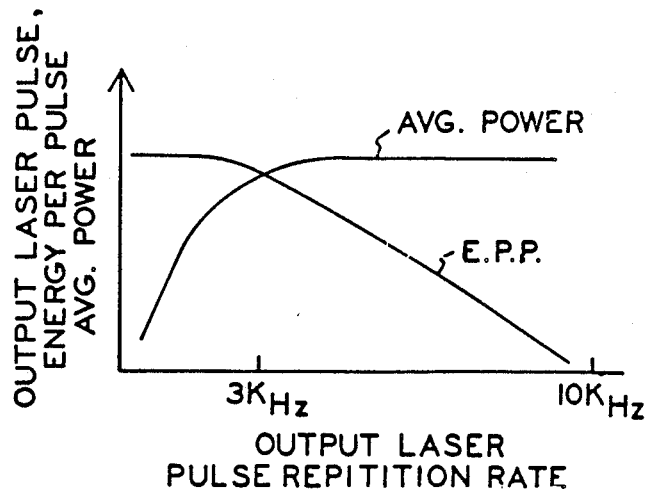
Figure 5:
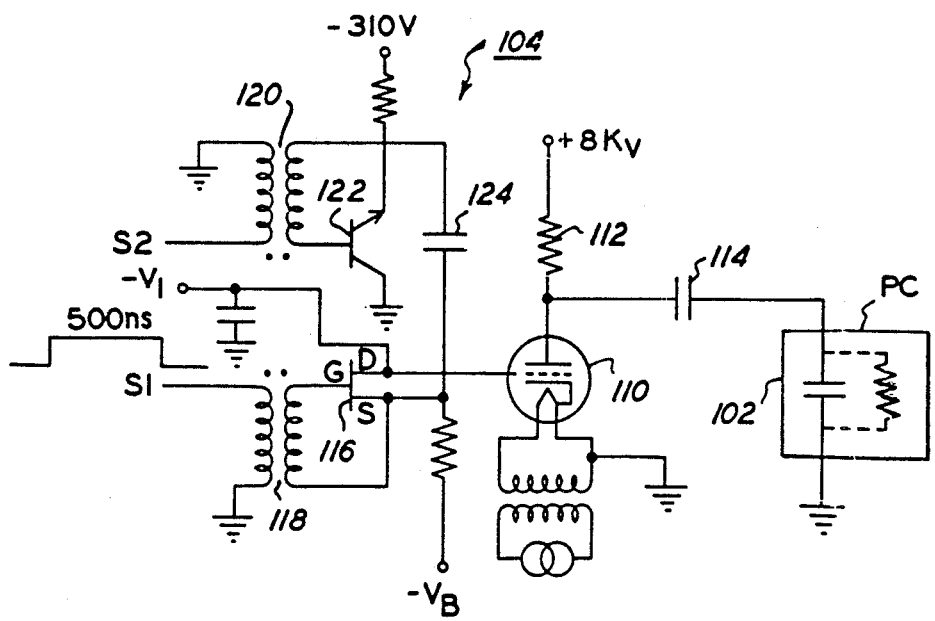

FIG. 4 are curves illustrating the variation in average power and energy per pulse with the repetition rate of the output laser pulses produced by the systems illustrated in FIGS. 1 and 2; and FIG. 5 is a schematic diagram illustrating the Pockels cell driver utilized in the system shown in FIG. 2; this Pockels cell driver being an improvement over the Pockels cell driver described in U.S. patent application Ser. No. 581,144 filed Feb. 17, 1984, the inventors of which include several of the inventors of the amplifier system herein described, which application is assigned to the same assignee as the present application.

Referring first to FIG. 1, there is shown a CW pumped modelocked Nd: YAG laser oscillator 10 which generates the seed pulses which are injected into a CW pumped Nd: YAG regenerative laser amplifier 12. The seed pulses are the input laser pulses to the regenerative amplifier 12 and are amplified therein to produce amplified output laser pulses. The system is controlled by a controller 14 by means of which the repetition rate of the output laser pulses may be varied; in this embodiment from down to almost zero Hz, up to 10 kHz.

Both the laser oscillator 10 and the amplifier 12 may use a commercially available laser head. This head consists of the laser medium which is a rod of Nd: YAG material. The laser gain medium is shown as a block 16 in the cavity of the oscillator 10 and block 18 in the cavity of the amplifier 12. The head of the oscillator 10 includes a lamp 20, preferably a krypton lamp, which is operated continuously in the CW mode from power supplied from a power supply 22. CW operation occurs when a switch 24 is closed. Similarly, the head in the amplifier 12 utilized a krypton lamp 26 which is operated in the CW mode by power from a power supply 28 when a switch 30 is closed. In both heads for the oscillator 10 and the amplifier 12, the lamp is located within an elliptical reflector. The gain medium rod is located at one locus of the ellipse and the lamp at the other. Both heads may be commercial devices; for example, the heads sold by Spectra-Physics, their Series 3000, being suitable. Other laser gain mediums may be used. Preferably these are crystalline materials which have high thermal conductivity and good gain. Such other materials may be Yittrium Lithium Fluoride (YLF), Emerald, or Alexandrite. The laser pulses produced by the Nd: YAG gain medium are 1.06 microns in wavelength.

The laser oscillator 10 has a cavity defined by a fully reflecting mirror 32 and a partially reflecting mirror 34. A modelocking crystal (ML) 36 is located in the cavity. The input laser pulses pass through the partially reflecting mirror 34 to a reflecting beam splitter 38. This beam splitter has a reflectivity of approximately four percent. Thus four percent of the energy of the pulses generated by the oscillator 10 is reflected to a bending mirror 40, focused by a lense 42 and reflected from another bending mirror 44 onto a polarizer 46 (a polarizing beam splitter) in the cavity of the regenerative amplifier 12. The input laser pulses containing most of the power are transmitted through the reflecting beam splitter 38 and may be used for other purposes, for example in pumping a dye laser after suitable doubling, as in the synchronously pumped dye laser described in the above referenced patent issued to G. Mourou. An absorber 48, which may be a plate coated with dark absorbing material, is disposed near the beam splitting reflecter 38 and used to absorb rejected input light pulses which come from the amplifier 12, as will be described below.

The cavity of the amplifier 12 is defined between two reflecting mirrors 50 and 52 at opposite ends thereof. Between the mirror 50 and the gain medium 18 in the cavity and aligned with the gain medium is a first Pockels cell 54 (PC 1), a quarter wave plate 58 and the polarizer 46. Another Pockels cell 60 (PC 2) is located between the gain medium 18 and the other mirror 52. These Pockels cells, PC 1 and PC 2 are desirably located close to the mirrors to lower timing requirements.

The controller 14 provides signals so that the amplifier 12 is operated synchronously with the oscillator 10. In other words, the signals produced by the controller are synchronous with the input laser pulses produced by the laser oscillator 10. Synchronism is obtained by using the same locking signal generator 62 to provide the drive signals $S_M$ or driving the modelocker 36 in the oscillator 10 and for driving a counter 64 in the controller. The modelocker may be an acousto-optic crystal which is driven by the signal $S_M$. The signal may be a high frequency sine wave from the generator 62, which may be a frequency synthesizer, which generates highly frequency stable high frequency signals. The signals have a wavelength equal to four times the cavity length in the amplifier. The counter 64 is a divide by N counter; i.e., a commercially available counter which can be controlled by switches so as to divide the high frequency signal $S_M$ by a selected dividing ratio. This dividing ratio is such that the output pulses from the counter may be varied from approximately zero Hz to 10 kHz.

The output pulses from the counter have a fast rise time, suitably less than 10 nanoseconds, and drive delay devices 66 and 68. These delay devices may be lengths of transmission line. The first delay device 66 provides a delay which is less than the traversal time (the time for one pass) of the laser pulses in the cavity of the amplifier 12. The delay line must be cut to prevent driving the first PC (54) when the pulse is between the PC1 (54) and mirror (50). The other delay device 68 provides a delay approximately equal to the time required for the seed pulse to reach its peak energy in the amplifier cavity. This delay may be approximately 500 ns. The outputs from the delay devices 66 and 68 are pulses, S1 and S2, respectively. The pulses operate Pockels cell drivers (PC Drivers) 70 and 72. These drivers may be of the type described in the above identified application for improved Pockels cell drivers. These drivers output pulses T1 and T2 which go to PC 1, 54 and PC 2, 60, respectively. The pulses have fast rise times less than the traversal time for laser pulses in the amplifier cavity and suitably approximately 5 ns. In the case of the pulse T1, it suitably has a duration of approximately 500 ns.

These drivers contain vacuum tubes, suitably microwave triodes, which are connected, through capacitors having capacitance much higher than the Pockels cell, to the Pockels cell. The anode of the triode is connected to a high voltage source. The triode is triggered by an avalanche transistor switch circuit. The Pockels cell and the capacitor is discharged through the triode when triggered. The output pulse has a very fast rise time, approximately 5 ns and a duration sufficient to cover the seed pulse amplification time. The driver circuit may be similar to the circuit described in connection with FIG. 5. The avalanche transistor switch which is connected to the grid of the tube is used in the embodiment of the system shown in FIG. 1. The other circuit which is connected to the grid and includes a field effect transistor is not used in this embodiment, but is used in the embodiment shown in FIG. 2 wherein a single Pockels cell is provided in the cavity of the amplifier;

thereby obtaining certain simplifications and cost reductions in the system.

In operation, only a portion of the energy of the pulses generated by the Nd: YAG laser oscillator 10 is used in order to avoid exciting unwanted modes of amplification in the cavity of the regenerative amplifier 12. These input pulses have the initial polarization such that they are reflected by the polarizer toward to the quarter wave plate 58. Initially, because of the delay, PC1, 54 is entirely transmissive and does not rotate the polarization of the pulses. The input pulses thus suffer a quarter wavelength rotation in passing through the wave plate 58 to the mirror 50 and another quarter wavelength rotation in a second pass through the wave plate 58. After traversing the cavity, the pulses accumulate an additional half wavelength of rotation (by passing twice through the quarter-wave plate 58). The pulses which are transmitted in the opposite direction as the input pulses, pass through the reflecting beam splitter 38 and are absorbed in the absorber 48. When the signal T1 is applied to PC 1, 54 it rotates the polarization of the laser pulses passing therethrough, and Q switches the cavity. The transition of T1 may be less than 10 ns such that only one pulse is plucked from the input laser pulses. This one pulse or a burst of pulses may be plucked when the Pockels cell 54 compensates for the polarization effect of the quarter-wave plate 58. The polarization is thus the same as the initial polarization and the pulses pass through the polarizer 46. The pulses also pass through the gain medium 18 and are increased in energy approximately 1.5 times during each double pass through the gain medium 18. The second Pockels cell PC 2, 60 does not have a signal T2 applied to it until approximately 500 ns later. A traversal of the amplifier cavity takes approximately 12 ns. Accordingly, there are approximately 45 traversals of the cavity before the signal T2 arrives. When T2 arrives the second Pockels cell, 60 rotates the polarization of these pulses by one quarter wavelength. The total rotation of the pulses when they reach the polarizer 46 is now one half wavelength. The polarizer then rejects the pulses and produces the output laser pulses. These pulses are amplified approximately $(10)^4$ times. Their average power will be in the Watt range or their energy per pulse may be in the mJ range, depending upon their repetition rate as will be apparent from FIG. 4.

Initially, the quarter-wave plate 58 provides a loss in the cavity of the amplifier 12 almost twice as great as the gain provided by the CW pump (the krypton lamp 26). This loss is instantaneously removed when PC 1 switches and rotates the polarization one quarter wavelength. The loss curve is shown at 80 in FIG. 3.

As the pulses traverse the cavity they extract energy from the gain medium which was imparted by the CW pump. The longer the pulses are in the cavity, the more energy is extracted and the less energy remains to be extracted. The loss in gain (electrons in populated excited states) over the fluorescence lifetime (approximately 300 ns) of the Nd: YAG gain medium is shown in curve 82 in FIG. 3. Since the maximum energy is extracted after the expiration of the fluorescence lifetime, for pulse rates which are greater than the reciprocal of the fluorescence lifetime (approximately 3 kHz) no more additional energy is available. Accordingly, the energy per pulse decreases. However, the average power of the output stays the same. Therefore, for output pulse repetition rates below 3 kHz the energy per pulse is high and the average power is low. For pulse rates above 3 kHz the energy per pulse decreases but the average power remains constant. These relationships will be apparent from the curves shown in FIG. 4.

Figure 3:
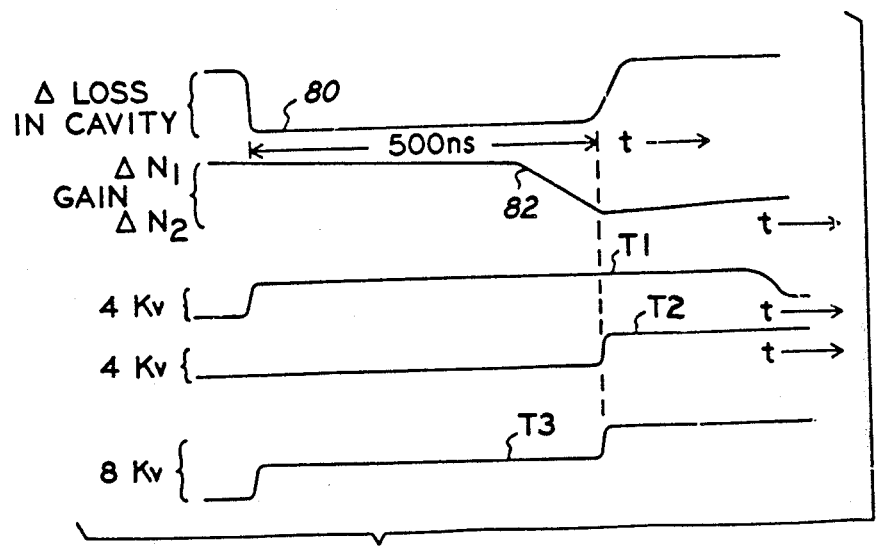
FIG. 3 is a series of curves illustrating the loss and gain and control signals used in the systems illustrated in FIGS. 1 and 2.

FIG. 3 also shows the waveform of the drive signals T1 and T2 for the Pockels cells 54 and 60. These curves illustrate the fast rise times of these pulses and point out that the pulses stay on for a period sufficient to trap pulses so that the fastest repetition rate of the output pulses may be obtained (10 kHz).

Referring to FIG. 2 there is shown another embodiment of the system. In this system, an Nd: YAG CW pumped laser oscillator 10 similar to the oscillator 10 shown in FIG. 1 is used. Like parts of the oscillator and other portions of the system to those shown in FIG. 1 are labelled with like reference numerals. The CW pump means are not illustrated in FIG. 2 for the sake of simplifing the drawing.

The system shown in FIG. 2 includes a regenerative amplifier 90 which is similar to the amplifier 12 in that it uses a CW pumped Nd: YAG laser head 92, cavity end mirrors 94 and 96, a polarizer 98 and a quarter wave plate 100 for initially frustrating the cavity, even though the gain medium fluoresces and can lase if the gain therein was sufficient.

Only a single Pockels cell 102 is used for Q switching the amplifier into operation, just like the Pockels cell PC 1, 54 in the system of FIG. 1. The Pockels cell 102 is driven by a Pockels cell driver 104 to which both control signals S1 and S2 from the controller are applied. The controller 14 is not shown in FIG. 2 to simplify the illustration. The Pockels cell driver produces an output signal T3, the waveform of which is shown in FIG. 3. The signals T1 and T2 reach a high voltage of 4 kv, which is sufficient to rotate the polarization in the Pockels cells PC 1, 54 and PC 2, 60 (FIG. 1) by one quarter wavelength. The Pockels cell drive signal T3 first reaches 4 kv, after the first delay, to Q switch and trap the laser pulses from the oscillator 10 in the cavity of the amplifier 90. For switch out from the cavity of the amplifier 90 when the signal S2 occurs, the Pockels cell drive voltage increases to 8 kv with a fast rise time, for example, 5 ns, so that it rotates the polarization of the laser pulses by one half wavelength. The pulses then reaching the polarizer 98 from the Pockels cell 102 are reflected by the polarizer and follow the path of the input laser pulses. This is the path also followed by the rejected pulses. The amplified pulses pass through a doubling crystal arrangement 106. Since doubling crystals operate efficiently with high amplitude laser pulses and not with low amplitude laser pulses, such as those rejected from the cavity of the amplifier, most of the low amplitude pulses are not frequency doubled in the doubling crystal. The high amplitude doubled pulses (half wavelength or approximately 0.53 microns), are reflected by the dichroic reflector 108 and provided doubled output laser pulses. These laser pulses may be used in a synchronously pumped dyelaser system as described in the above-referenced Mourou patent.

Referring to FIG. 5, there is shown the Pockels cell driver 104. The driver includes a microwave triode 110. The anode of the triode is connected through a high resistance (megohm range) resistor 112 to a source of high voltage indicated as 8 kv. The anode is connected through a capacitor of high capacitance 114 to one side of the Pockels cell 102, which is illustrated as a capacitor having an internal resistance shunting it. The PC capacitor is effectively connected to ground. The cathode of the triode 110 is also connected ground through its filament transformer. Thus, the Pockels cell and cathode are interconnected.

The triode 110 is operated first in a linear mode for 500 nanoseconds then operated in a switch mode as follows.

When signal S1 is applied to the field effect transistor (FET) 116 via a coupling transformer 118, the FET 116 is turned on for the duration of the input 500 ns pulse. The FET conducts; acting as a low impedance switch and connects voltage ($-V$) to the grid of the tube 110. This action changes the bias voltage of the tube from cutoff ($-V_B$) to a conduction region of the linear portion of the tube's operating characteristics. The tube 110 is biased to operate with a 4 kv drop in potential or half the voltage present on the anode of the tube. This action causes a quarter wavelength change in the PC 102 polarization. After a period of 500 ns, a second trigger S2 is applied via the coupling transformer 120 to the avalanche transistor 122. The capacitor 124, is charged to about $-270$ volts (the avalanche bias of the transistor 122) is then discharged through the transistor 122 when it switches in a fast avalanche mode. This action presents a large positive going pulse on the grid of tube 110 and causes it to switch fully on to discharge capacitor 114. Since the PC 102 is in series with capacitor 114, its capacitance is also discharged in the same fast manner; thus causing an additional quarter wavelength rotation of the polarization. This voltage remains on for sufficient time to extract one or a burst of amplified output laser pulses from the cavity of the regenerative amplifier 90.

From the foregoing description it will be apparent that there has been provided improved regenerative laser amplifier systems which are CW operated and provide output laser pulses with variable repetition rates. Variations and modifications in the herein described systems, within the scope of the invention will undoubtedly suggest themselves to those skilled in the art. Accordingly, the foregoing description should be taken as illustrative and not in a limiting sense.

We claim:

1. Regenerative laser apparatus comprising an optical cavity, a gain medium in said cavity, means for CW pumping said gain medium, means for injecting laser pulses into said cavity and providing multiple traversals of said cavity and medium thereby amplifying said pulses, and means for controlling the rate at which said pulses are injected into said cavity and said amplified pulses are outputted from said cavity.

2. Laser apparatus according to claim 1 wherein said gain medium is a crystalline material.

3. Laser apparatus according to claim 2 wherein said material is selected from the group consisting of Nd: YAG, Yittrium Lithium Fluoride, Alexanderite, and Emerald.

4. Laser apparatus according to claim 1 wherein said medium is a rod of Nd: YAG.

5. Laser apparatus according to claim 1 wherein said cavity includes means for inhibiting laser oscillations in said cavity from said CW pump medium until laser pulses are injected into said cavity.

6. Laser apparatus according to claim 1 further comprising means for generating the laser pulses which are injected into said cavity comprising a CW pumped laser modelocked synchronously with the laser pulses injected into said cavity.

7. Laser apparatus according to claim 6 wherein said CW pumped modelocked laser has a gain medium of the same material as the gain medium in said cavity.

8. Laser apparatus according to claim 1 wherein said injecting means comprises polarization sensitive means in said cavity for reflecting said laser pulses into and out of said cavity, and means for selectively rotating the polarization of said laser pulses for trapping laser pulses reflected by said reflecting means into said cavity.

9. Laser apparatus according to claim 8 wherein said polarization rotating means comprises at least one Pockels cell operated by said controlling means.

10. Laser apparatus according to claim 9 wherein said controlling means comprises means for generating first signals for operating said Pockels cell and second signals which are synchronous with each other, means for controlling the generation of said laser pulses which are injected into said cavity with said second signals, and means for varying the repetition rate of said first signals for controlling the rate at which said laser pulses are injected into and said amplified pulses are outputted from said cavity.

11. Laser apparatus according to claim 8 further comprising means in said cavity for frustrating lasing therein until said means for selectively rotating the polarization of said laser pulses is operated to trap said laser pulses in said cavity.

12. Laser apparatus according to claim 11 wherein said frustrating means is a quarter wave plate.

13. Laser apparatus according to claim 8 wherein said polarization rotating means comprises means for providing a first rotation of polarization to trap said laser pulses in said cavity and a second rotation of polarization after said multiple traversals to enable said amplified pulses to be outputted from said cavity.

14. Laser apparatus according to claim 13 wherein said means for providing said first rotation of polarization and said second rotation of polarization comprise first and second Pockels cells.

15. Laser apparatus according to claim 14 wherein said rotation providing means comprising means for driving said first and second Pockels cells to produce quarter wavelength rotations of said polarization of said laser pulses in said cavity.

16. Laser apparatus according to claim 13 wherein said means for providing said first rotation of polarization and said second rotation of polarization comprise a single Pockels cell in said cavity, and means for driving said single Pockels cell to selectively produce a quarter wavelength rotation of the polarization of said laser pulses and a half wavelength rotation of the polarization of said laser pulses, one of said rotations to trap said laser pulses in said cavity and the other to enable the outputting of said laser pulses from said cavity by said polarization sensitive reflecting means.

17. Laser apparatus according to claim 15 wherein said Pockels cell driver means include means for repetitively generating high voltage drive signals having a rise time less than the time for a traversal of said laser pulses in said cavity.

18. Laser apparatus according to claim 16 wherein said Pockels cell driver means include means for generating repetitively a first high voltage drive signal and a second high voltage drive signal of approximately twice the amplitude of said first drive signal, said first and second drive signals having rise times less than the time for a traversal of said laser pulses in said cavity.

19. Laser apparatus according to claim 18 wherein said Pockels cell driver means comprise a vacuum tube having a cathode, a grid, and an anode, a resistor connecting said anode to a source of high voltage, at least as high as the half wavelength voltage of said Pockels cell, a capacitor having a capacitance higher than that of said Pockels cell connecting said anode to one end of said Pockels cell, means connecting the other end of said Pockels cell to said cathode, first means connected to the grid of said triode for applying a first repetitive control signal thereto from said controlling means for driving said tube linearly to produce a voltage corresponding to the quarter wavelength voltage of said Pockels cell there across, and second means connected to said grid responsive to repetitive control signals from said controlling means for switching said tube into conduction to discharge said capacitor and charge the capacitance presented by said Pockels cell to increase the voltage across said Pockels cell to the half wavelength voltage thereof.

20. A CW pumped, variable repetition rate regenerative laser amplifier system which comprises a CW pumped modelocked laser for generating input laser pulses and having modelocking means, a regenerative laser amplifier having an optical cavity, a laser gain medium in said cavity, a polarizer for reflecting input pulses into said cavity and for reflecting amplified output pulses therefrom, means including at least one Pockels cell for rotating the polarization of laser pulses in said cavity, means for CW pumping said laser gain medium, means for directing said input laser pulses from said modelocked laser to said polarizer, a source of high frequency signals for modelocking said modelock laser connected to said modelocking means, responsive to said high frequency signals for providing first and second control signals delayed with respect to each other by the time for a multiplicity of traversals of said laser pulses in said cavity and with variable repetition rates corresponding to the desired repetition rates of the amplified output laser pulses from said laser amplifier, and means for applying said control signals to said polarization rotating means for trapping said input laser pulses in said cavity when said first control signals are applied and obtaining said amplified output laser pulses from said cavity when said second control signals are applied.

21. The system according to claim 20 wherein said first and second control signals providing means comprise a counter having a variable dividing ratio for counting the repetitions of said high frequencies signal and providing output signals of variable repetition rate, and delay means responsive to said output signals for providing said first and second control signals, and driver means responsive to said control signals and connected to said polarization rotating means.

22. The system according to claim 21 wherein said delay means include means introducing a first delay less than the time for a single traversal of said cavity by said laser pulses and producing said first control signals with said first delay and also includes means for introducing a second delay approximately equal to the time for multiple traversals of said cavity and producing said second control signals with said second delay.

23. The system according to claim 22 wherein said cavity has mirrors at the opposite ends thereof, said polarization rotating means including a first Pockels cell between said gain medium and the mirror at one of said opposite ends and said polarizer being disposed between said first Pockels cell and said gain medium.

24. The system according to claim 23 wherein a quarter wave plate is disposed between said polarizer and said first Pockels cell.

25. The system according to claim 24 wherein said driver means include means responsive to said first control signals for driving said first Pockels cell to introduce a quarter wavelength rotation of the polarization of said laser pulses and to said second control signal for driving said first Pockels cell to introduce a half wavelength rotation of the polarization of said laser pulses.

26. The system according to claim 24 wherein said polarization rotating means include a second Pockels cell disposed between said mirror at the other end of said cavity and said gain medium, and said driver means include means responsive to said first control signals for driving said first Pockels cell to introduce a quarter wavelength rotation of the polarization of said laser pulses, and means responsive to said second control signals for driving said second Pockels cell to introduce a quarter wavelength rotation of the polarization of said laser pulses.

27. The system according to claim 20 wherein said means for directing said input pulses to said polarizer include a partially reflecting mirror which reflects a portion of the energy of said input pulses to said polarizer.

* * * * *